(12) United States Patent
Zhan et al.

(10) Patent No.: US 11,359,109 B1
(45) Date of Patent: Jun. 14, 2022

(54) METHOD FOR CREATING WATER-BASED ACRYLIC RESIN COATING WITH HIGH WATER RESISTANCE

(71) Applicant: DEHUA TB NEW DECORATION MATERIAL CO., LTD., Huzhou (CN)

(72) Inventors: Xianxu Zhan, Huzhou (CN); Shixiong Sheng, Huzhou (CN); Yan Wu, Huzhou (CN); Xinhao Feng, Huzhou (CN); Xuqin Xie, Huzhou (CN); Weida Xu, Huzhou (CN); Ping Wang, Huzhou (CN)

(73) Assignee: DEHUA TB NEW DECORATION MATERIAL CO., LTD., Huzhou (CN)

( * ) Notice: Subject to any disclaimer, the term of this patent is extended or adjusted under 35 U.S.C. 154(b) by 0 days.

(21) Appl. No.: 17/386,159

(22) Filed: Jul. 27, 2021

(30) Foreign Application Priority Data

Apr. 22, 2021 (CN) .......................... 202110434193.1

(51) Int. Cl.
*C09D 133/04* (2006.01)
*B05D 1/02* (2006.01)
*B05D 3/02* (2006.01)
*C09D 7/20* (2018.01)
*B05D 3/06* (2006.01)

(52) U.S. Cl.
CPC ............. *C09D 133/04* (2013.01); *B05D 1/02* (2013.01); *B05D 3/0209* (2013.01); *B05D 3/0263* (2013.01); *B05D 3/067* (2013.01); *C09D 7/20* (2018.01)

(58) Field of Classification Search
CPC .......... C09D 133/04; C09D 7/20; B05D 1/02; B05D 3/0209; B05D 3/0263; B05D 3/067
See application file for complete search history.

(56) References Cited

U.S. PATENT DOCUMENTS 6,257,732 B1 * 7/2001 Takahagi ................ C23C 18/44
359/884

* cited by examiner

*Primary Examiner* — Alexander M Weddle
(74) *Attorney, Agent, or Firm* — Olive Law Group, PLLC

(57) ABSTRACT

The present disclosure relates to the technical field of water-based acrylic resin coatings, in particular to a method for creating a water-based acrylic resin coating with high water resistance. It includes the following steps: selecting a commercially available water-based acrylic resin paint; mixing the water-based acrylic resin paint and ethyl acetate to obtain solution A, spraying solution A on a surface of a material or immersing the material in solution A, and then solidifying; mixing lye and a silver precursor solution to obtain solution B; immersing the cured material in solution B and then drying the cured material.

10 Claims, No Drawings

METHOD FOR CREATING WATER-BASED ACRYLIC RESIN COATING WITH HIGH WATER RESISTANCE

CROSS REFERENCE TO RELATED APPLICATION

This application claims priority to Chinese Patent Application No. 2021104341931, filed Apr. 22, 2021, the contents of which are incorporated herein by reference in their entireties.

TECHNICAL FIELD

The present disclosure relates to the technical field of water-based acrylic resin coatings, and in particular, to a method for creating a water-based acrylic resin coating with high water resistance.

BACKGROUND

Water-based acrylic resin coating is a water-based coating with acrylate or other vinyl monomers as the main film-forming substance. Its main components include acrylic resin emulsion, acrylic resin aqueous dispersion and acrylic resin aqueous solution. Water-based acrylic coating has the advantages of light color, high transparency, high brightness, high solid content, strong adhesion, good construction performance, and safe use. Therefore, it is more and more favored by consumers and has broad market potential and development prospects.

However, since the water-based acrylic resin uses water as the dispersion medium, it is prone to incomplete curing during the curing process, and the residual water-based additives lead to poor water resistance of the coating. In addition, compared with solvent-based coatings, the heat of evaporation of water is large, so water-based acrylic resin coatings have a long drying time and high energy consumption. The residual water-based additives also have an adverse effect on the water resistance of the paint film. Therefore, there is an urgent need for a water-based acrylic resin coating with high water resistance.

In the prior art, in order to reduce the restrictions on the use of water-based acrylic coatings, various modification studies have been carried out on water-based acrylic resin coatings to improve their water resistance. For example, with organic silicon modification, the main characteristic of silicon atoms in organic silicon is that it has a unique electronic structure, allowing the silicon-oxygen bond to have the characteristics of a double bond. The characteristic of silicone, such as the hydrophobicity, high and low temperature resistance, can improve the stain resistance and water resistance of acrylic resin. In addition, methods of modifying water-based acrylic resin coatings with organic fluorine, polyurethane, etc. are adopted.

The patent with the publication No. CN102417773A discloses such a superhydrophobic acrylic resin coating. The coating is composed of nanoparticles, acrylic resin, mixed solvent, and heptafluorotrimethoxy ethoxy silane. The ratio of each component is: nanoparticle:acrylic resin:mixed solvent:heptafluorotrimethoxy ethoxy silane=100:(20-60):(20-600):(3-10). After spraying the coating on the solid surface, the contact angle of the water droplets on the surface is between 150-160°, and the rolling angle is less than 10°. In this patent, the hydrophobic modification is mainly carried out by simply physically mixing the nanoparticles, and the nanoparticles are easy to fall off the coating, resulting in the problem that the hydrophobicity of the coating decreases after long-term use.

SUMMARY

The present disclosure is to solve the above-mentioned problems and provide a method for creating a water-based acrylic resin coating with high water resistance.

The technical solution of the present disclosure to solve the problem is to provide a method for creating a water-based acrylic resin coating with high water resistance, including the following steps:

a, selecting a commercially available water-based acrylic resin paint;

b, mixing the water-based acrylic resin paint and ethyl acetate to obtain solution A, spraying solution A on a surface of a material or immersing the material in solution A, and then curing;

c, mixing lye and a silver precursor solution to obtain solution B; immersing the cured material in solution B and then drying the cured material.

High water resistance is usually achieved by hydrophobic modification. At present, there are two main methods for preparing hydrophobic surfaces. One is to create rough micron or nanostructures on the surface of the material, and the other is to modify low surface energy substances on the rough surface.

In the prior art, nano-silver oxide and nano-silver are usually simply physically mixed in the paint to improve the bactericidal performance of the paint. The inventor of the present application unexpectedly discovered that under the condition of ethyl acetate, on the cured water-based acrylic resin coating, the silver oxide can be created indirectly through the lye and the silver precursor, and a rough coating surface can be created, so as to create a larger coating-water contact angle and improve the hydrophobicity of the coating surface.

The applicant has analyzed and believed that the principle is: first of all, ethyl acetate is adopted as the solvent of the water-based acrylic resin coating, the two are mixed uniformly and sprayed on the surface of the material to obtain an acrylic resin-ethyl acetate coating. Then, when the cured acrylic resin-ethyl acetate coating is immersed in the lye and silver precursor mixture (ie solution B). First, the lye will react with the silver precursor to produce silver oxide that will grow on the surface of acrylic resin-ethyl acetate, forming nano-scale protrusions, like the papillae on the surface of the lotus leaf, such that the first layer of roughness is created. Second, under the action of lye, part of ethyl acetate undergoes alkaline hydrolysis to produce acetate and ethanol, such as to allow the original acrylic resin-ethyl acetate coating, due to the departure of ethyl acetate, to form a large amount of micropores, such that the second layer of roughness is create. Third, since the formation of the above-mentioned micropores requires lye consumption, resulting in that the alkali concentration near the micropores is low, and the generation of silver oxide also requires lye. Therefore, the generation of silver oxide near the micropores is less than that of other parts. The roughness is increased. Fourth, because the decomposition of ethyl acetate mentioned above will produce ethanol, and silver oxide can oxidize ethanol to acetaldehyde under the catalysis of alkaline medium, and silver oxide itself can be reduced to elemental silver; further, acetaldehyde can reduce silver ions and silver oxide to elemental silver. Therefore, the acrylic resin-ethyl acetate coating not only grows nano-silver oxide, but also grows nano-silver. Nano-silver oxide and nano-silver themselves have different grain diameters, thus further creating a third layer of roughness.

In addition, the nano-silver oxide and nano-silver grown on the acrylic resin-ethyl acetate coating can also bring effective antibacterial properties to the coating, further improving the practicability of the coating.

In order to further improve the hydrophobic properties of the coating in the present application, as a preference of the present disclosure, it also includes the following step d: mixing stearic acid, acetic acid and absolute ethanol to obtain solution C; immersing the material after dried in step c in solution C, and drying the material.

The coating can be further treated with low surface energy by stearic acid. At the same time, the carboxyl groups in the stearic acid molecule chemically bond with the hydroxyl groups adsorbed on the surface of the silver oxide nanoparticles, and finally a coral-like silver stearate rough surface is formed, which further improves the superhydrophobic properties of the coating.

In order to improve the adhesion strength of the acrylic resin-ethyl acetate coating on the material, as a preference of the present disclosure, in step b, pre-treating the material before spraying: immersing the material in an ethanol solution, and processing with ultrasonic treatment for 20-30 minutes, then drying the material.

At the same time, among them, the ethanol solution can also increase the concentration of the hydroxyl group on the coating, so that in the subsequent operation, the carboxyl group in the stearic acid is chemically bonded to the hydroxyl group to increase the proportion of stearic acid grafted onto the coating, such as to improve the effect of stearic acid on the low surface energy treatment of the coating.

As a preference of the present disclosure, in step b, using infrared drying at 70-95° C. firstly, and then curing.

As a preference of the present disclosure, multi-stage infrared drying at conditions of 70-78° C., 78-85° C., and 85-95° C. in sequence is adopted.

Through the three-stage infrared leveling and drying process at different temperatures, the moisture present in the water-based acrylic resin coating can be gradually separated from the system under the action of infrared rays with a temperature from low to high. The setting of three-stage can, on the one hand, increase the time of infrared leveling and drying, on the other hand, it can perform infrared leveling and drying of the system in a deeper level, fully volatilize the water in it, making the water content in the system lower, and the cured paint film can have better water-resistant performance.

As a preference of the present disclosure, multi-stage curing is used, followed by curing under the conditions of 50%, 100%, and 50% of the power of the UV curing lamp.

As a preference of the present disclosure, in step c, drying is performed at 95-105° C. after immersing for 5-10 minutes.

As a preference of the present disclosure, in step d, immersing is performed for 45-60 minutes.

As a preference of the present disclosure, the preparation method of the solution A is: dropping 1 part of ethyl acetate into 3-5 parts of water-based acrylic resin paint according to the mass ratio, stirring for 30-40 minutes.

As a preference of the present disclosure, the solution C contains 10 parts of absolute ethanol, 2.5-3.5 parts of acetic acid and 0.5-1.5 parts of stearic acid according to parts by mass.

The beneficial effects of the present disclosure:

1. In the present disclosure, under the condition of ethyl acetate, on the cured water-based acrylic resin coating, the silver oxide may be created indirectly through the lye and the silver precursor, which can create a rough coating surface, thereby creating a larger coating-water contact angle, so as to improves the hydrophobicity of the coating surface.

2. The present disclosure introduces nano-silver oxide and nano-silver while creating a superhydrophobic surface. Nano-silver oxide and nano-silver have strong antibacterial activity. Using them instead of bactericides can improve the antibacterial properties of materials in a green and environmentally friendly manner.

3. The present disclosure further uses stearic acid for low surface energy treatment to create a coral-like silver stearate rough surface on the surface of the material to further improve the hydrophobicity.

DESCRIPTION OF EMBODIMENTS

The following are specific implementations of the present disclosure and are used to further describe the technical solutions of the present disclosure, but the present disclosure is not limited to these embodiments.

Example 1 (Exp. 1)

A method for creating a water-based acrylic resin coating with high water resistance may include the following steps:

a. selecting any commercially available water-based acrylic resin paint: selecting a water-based acrylic resin paint that meets the "HGT 4758-2014 Waterborne Acrylic Resin Paint Industry Standard". The material may be cotton fabric.

b. dropping 1 part of ethyl acetate into 4 parts of water-based acrylic resin paint according to the mass ratio, and then stirring for 35 minutes to obtain solution A.

The solution A may be coated on the surface of the material with a 50 μm wet film preparer, and then the material may be placed in an infrared drying box with an infrared ceramic heating tube installed at the bottom of the box. The temperature may be set to 80° C. and drying may be carried out for 10 minutes. The material may be then placed in a UV curing box. Three UV tubes may be installed on the top of the box. Each tube may have a rated power of 7000 W, and the curing may be completed at 7000 W.

c. mixing 0.1 mol/L sodium hydroxide and silver nitrate solution to obtain solution B; immersing the cured material in solution B for 8 minutes, and then drying at 100° C., to obtain a water-based acrylic resin coating material with high water resistance.

A contact angle tester may be adopted to test the wettability of the coating surface on the prepared material, and the results are shown in Table 1.

Example 2 (Exp. 2)

The present example is basically the same as Example 1, and the difference is only:

In this example, the following step d may be further included: mixing 1 part of stearic acid, 3 parts of acetic acid and 10 parts of absolute ethanol according to parts by mass, to obtain solution C; immersing the dried material in step c in solution C for immersed for 50 minutes, and then drying, to obtain a water-based acrylic resin coating material with high water resistance.

A contact angle tester may be used to test the wettability of the coating surface on the prepared material, and the results are shown in Table 1.

Example 3 (Exp. 3)

This example is basically the same as Example 2, and the only difference is:

In this example, in step b, before spraying, the material needs to be pre-treated: immersing the material in a 70% ethanol solution, ultrasonically treating for 25 minutes, and then drying; then coating solution A on the material.

A contact angle tester may be used to test the wettability of the coating surface on the prepared material, and the results are shown in Table 1.

Example 4 (Exp. 4)

This example is basically the same as Example 3, and the only difference is:

In this example, in step b, a conveyor belt may be set, and an infrared drying device and a UV curing device may be sequentially set along the conveying direction of the conveyor belt. Among them, the infrared drying device adopts three infrared drying ovens connected in series, and the temperature may be set to 75° C., 80° C., and 90° C. in sequence along the conveying direction of the conveyor belt. There may be 3 UV lamps in the UV curing box along the conveying direction of the conveyor belt. Each lamp may have a rated power of 7000 W. Each UV lamp may have an independent power control. The power may be adjusted to 3500 W, 7000 W, and 3500 W along the conveying direction of the conveyor belt. The material may be placed on the conveyor belt of the production line, and the conveyor belt drives the material to pass through the infrared drying device and the UV curing device at a speed of 0.5 m/s to complete the drying and curing.

Example 5 (Exp. 5)

A method for creating a water-based acrylic resin coating with high water resistance may include the following steps:

a. selecting any commercially available water-based acrylic resin paint: selecting a water-based acrylic resin paint that meets the "HGT 4758-2014 Waterborne Acrylic Resin Coating Industry Standard". The material may be wood-plastic composite board.

b. immersing the material in a 50% ethanol solution, ultrasonically treating for 20 minutes, and then drying.

According to the mass ratio, 1 part of ethyl acetate may be dropped into 3 parts of the water-based acrylic resin paint, and stirring may be carried out for 30 minutes to obtain solution A.

The material may be immersed in solution A for 30 minutes and then taken out.

A conveyor belt may be provided, and an infrared drying device and a UV curing device may be sequentially arranged along the conveying direction of the conveyor belt. Among them, the infrared drying device may adopt three infrared drying ovens connected in series, and the temperature may be set to 70° C., 78° C., and 85° C. in sequence along the conveying direction of the conveyor belt. There may be 3 UV lamps in the UV curing box along the conveying direction of the conveyor belt. Each lamp may have a rated power of 6000 W. Each UV lamp may have an independent power control. The power may be adjusted to 3000 W, 6000 W, and 4000 W along the conveying direction of the conveyor belt. The material may be placed on the conveyor belt of the production line, and the transmission belt drives the material to pass through the infrared drying device and the UV curing device at a speed of 0.2 m/s to complete the drying and curing.

c. mixing 0.1 mol/L sodium hydroxide and silver nitrate solution to obtain solution B; immersing the cured material in solution B for 5 minutes, and then drying at 95° C.

d. mixing 0.5 parts of stearic acid, 2.5 parts of acetic acid and 10 parts of absolute ethanol according to parts by mass to obtain solution C; the dried material in step c may be immersed in solution C for 45 minutes and then dried. A water-based acrylic resin coating material with high water resistance may be obtained.

A contact angle tester may be used to test the wettability of the coating surface on the prepared material, and the results are shown in Table 1.

Example 6 (Exp. 6)

A method for creating a water-based acrylic resin coating with high water resistance may include the following steps:

a. selecting any commercially available water-based acrylic resin paint: selecting a water-based acrylic resin paint that meets the "HGT 4758-2014 Waterborne Acrylic Resin Coating Industry Standard". The material may be solid wood board.

b. immersing the material in a 30% ethanol solution, ultrasonically treating for 30 minutes, and then drying.

According to the mass ratio, 1 part of ethyl acetate may be dropped into 5 parts of water-based acrylic resin paint, stirred for 40 minutes, to obtain solution A.

The material may be immersed in solution A for 30 minutes and taken out.

A conveyor belt may be provided, and an infrared drying device and a UV curing device may be sequentially arranged along the conveying direction of the conveyor belt. Among them, the infrared drying device may adopt three infrared drying ovens connected in series, and the temperature may be set to 78° C., 85° C., and 95° C. in sequence along the conveying direction of the conveyor belt. There may be 3 UV lamps in the UV curing box along the conveying direction of the conveyor belt. Each lamp may have a rated power of 8000 W. Each UV lamp may have an independent power control. The power may be adjusted to 4000 W, 8000 W, and 3000 W along the conveying direction of the conveyor belt. The material may be placed on the conveyor belt of the production line, and the conveyor belt drives the material to pass through the infrared drying device and the UV curing device at a speed of 1.2 m/s to complete the drying and curing.

c, mixing 0.1 mol/L sodium hydroxide and silver nitrate solution to obtain solution B; immersing the cured material in solution B for 10 minutes, and then drying at 105° C.

d, mixing 1.5 parts of stearic acid, 3.5 parts of acetic acid and 10 parts of absolute ethanol according to parts by mass to obtain solution C. The dried material in step c may be immersed in solution C for 60 minutes and then dried. A water-based acrylic resin coating material with high water resistance may be obtained.

A contact angle tester may be used to test the wettability of the coating surface on the prepared material, and the results are shown in Table 1.

Comparative Example 1 (Cmp. Exp. 1)

The water-based acrylic resin coating selected in Example 1 was directly coated on the surface of the cotton fabric with a 50 μm wet film preparer, and then the cotton fabric was dried and cured by the method of Example 1. The wettability of the coating surface was tested with a contact angle tester on the cotton fabric obtained by drying and curing. The results are shown in Table 1 below.

Comparative Example 2 (Cmp. Exp. 2)

This comparative example is basically the same as Example 1, and the only difference is that: without adding sodium hydroxide and silver nitrate solution (that is, without performing step c), directly testing the dried and cured material in step b with a contact angle tester of the wettability of the coating surface, the results are shown in Table 1.

Comparative Example 3 (Cmp. Exp. 3)

This comparative example is basically the same as Example 1, with the only difference being: in step b, no ethyl acetate is added. The water-based acrylic resin paint selected in Example 1 was directly coated on the surface of the material with a 50 m wet film preparer, and then the material was dried and cured by the method of Example 1. Step c is performed on the material obtained by drying and curing, and the wettability of the coating surface of the obtained material is tested with a contact angle tester. The results are shown in Table 1 below.

Comparative Example 4 (Cmp. Exp. 4)

This comparative example is basically the same as Example 2, with the only difference being: in step b, no ethyl acetate is added. The obtained material was tested for the wettability of the coating surface with a contact angle tester. The results are shown in Table 1 below.

TABLE 1

| Exp. group | Water-based acrylic paint | Ethyl acetate | NaOH and AgNO3 | Stearic acid | Pre-treat to material | Drying and curing step by step | Contact angle |
| --- | --- | --- | --- | --- | --- | --- | --- |
| Exp. 1 | ✓ | ✓ | ✓ | | | | $(158 \pm 1)°$ |
| Exp. 2 | ✓ | ✓ | ✓ | ✓ | | | $(168 \pm 1)°$ |
| Exp. 3 | ✓ | ✓ | ✓ | ✓ | ✓ | | $(169 \pm 1)°$ |
| Exp. 4 | ✓ | ✓ | ✓ | ✓ | ✓ | ✓ | $(170 \pm 1)°$ |
| Exp. 5 | ✓ | ✓ | ✓ | ✓ | ✓ | ✓ | $(169 \pm 1)°$ |
| Exp. 6 | ✓ | ✓ | ✓ | ✓ | ✓ | ✓ | $(169 \pm 1)°$ |
| Cmp. Exp. 1 | ✓ | | | | | | $(72 \pm 1)°$ |
| Cmp. Exp. 2 | ✓ | ✓ | | | | | $(72 \pm 1)°$ |
| Cmp. Exp. 3 | ✓ | | ✓ | | | | $(81 \pm 1)°$ |
| Cmp. Exp. 4 | ✓ | | ✓ | ✓ | | | $(164 \pm 1)°$ |

As shown in Table 1, by comparing the contact angle test data of Example 1, Comparative Example 1, Comparative Example 2, and Comparative Example 3, it can be seen that in the present disclosure, the technical means of indirectly constructing silver oxide with lye and silver precursors under the condition of ethyl acetate can effectively increase the contact angle of the coating with water, thereby improving the water resistance of the coating. By comparing Example 2 and Comparative Example 4, it can be seen that although the contact angle of the coating can be increased to a certain extent by the preparation of silver stearate in the traditional technology, the contact angle can be further increased under the action of ethyl acetate, which greatly improves the water resistance of the coating.

The specific embodiments described herein are merely illustrative of the spirit of the present disclosure. Those skilled in the art to which the present disclosure belongs can make various modifications or additions to the specific embodiments described or use similar alternatives, but they will not deviate from the spirit of the present disclosure or exceed the definition range of the appended claims.

What is claimed is:

1. A method for creating a water-based acrylic resin coating with high water resistance, comprising the following steps:
   a, selecting a commercially available water-based acrylic resin paint;
   b, mixing the water-based acrylic resin paint and ethyl acetate to obtain solution A, spraying solution A on a surface of a material or immersing the material in solution A, and then curing;
   c, mixing lye and a silver precursor solution to obtain solution B; immersing the cured material in solution B and then drying the cured material.

2. The method for creating a water-based acrylic resin coating with high water resistance according to claim 1, further comprising the following step d: mixing stearic acid, acetic acid and absolute ethanol to obtain solution C; immersing the material after dried in step c in solution C, and drying the material.

3. The method for creating a water-based acrylic resin coating with high water resistance according to claim 1, wherein: in step b, pre-treating the material before spraying: immersing the material in an ethanol solution, and processing with ultrasonic treatment for 20-30 minutes, then drying the material.

4. The method for creating a water-based acrylic resin coating with high water resistance according to claim 1, wherein: in step b, using infrared drying at 70-95° C. firstly, and then curing.

5. The method for creating a water-based acrylic resin coating with high water resistance according to claim 4, wherein multi-stage infrared drying at conditions of 70-78° C., 78-85° C., and 85-95° C. in sequence is adopted.

6. The method for creating a water-based acrylic resin coating with high water resistance according to claim 4, wherein: multi-stage curing at conditions of UV light curing with 3000-4000 W, 6000-8000 W, and 3000-4000 W in sequence is adopted.

7. The method for creating a water-based acrylic resin coating with high water resistance according to claim 1, wherein: in step c, drying is performed at 95-105° C. after immersing for 5-10 minutes.

8. The method for creating a water-based acrylic resin coating with high water resistance according to claim 2, wherein: in step d, immersing is performed for 45-60 minutes.

9. The method for creating a water-based acrylic resin coating with high water resistance according to claim 1, wherein: a preparation method of the solution A is: dropping 1 part of ethyl acetate into 3-5 parts of water-based acrylic resin paint according to the mass ratio, stirring for 30-40 minutes.

10. The method for creating a water-based acrylic resin coating with high water resistance according to claim 2, wherein the solution C contains 10 parts of absolute ethanol, 2.5-3.5 parts of acetic acid and 0.5-1.5 parts of stearic acid according to parts by mass.

\* \* \* \* \*